(12) United States Patent
Berdou et al.

(10) Patent No.: US 9,897,316 B2
(45) Date of Patent: Feb. 20, 2018

(54) COMBUSTION CHAMBER FOR A TURBINE ENGINE

(75) Inventors: Caroline Jacqueline Denise Berdou, Palaiseau (FR); Laurent Bernard Cameriano, Avon (FR)

(73) Assignee: SNECMA, Paris (FR)

( * ) Notice: Subject to any disclaimer, the term of this patent is extended or adjusted under 35 U.S.C. 154(b) by 1168 days.

(21) Appl. No.: 13/514,060

(22) PCT Filed: Dec. 2, 2010

(86) PCT No.: PCT/FR2010/052600
§ 371 (c)(1),
(2), (4) Date: Jun. 6, 2012

(87) PCT Pub. No.: WO2011/070273
PCT Pub. Date: Jun. 16, 2011

(65) Prior Publication Data
US 2012/0240584 A1    Sep. 27, 2012

(30) Foreign Application Priority Data

Dec. 11, 2009    (FR) .................................. 09 06009

(51) Int. Cl.
*F23R 3/00* (2006.01)
*F23R 3/50* (2006.01)

(52) U.S. Cl.
CPC .............. *F23R 3/002* (2013.01); *F23R 3/50* (2013.01); *F23M 2900/05004* (2013.01); *F23R 2900/00005* (2013.01); *F23R 2900/00018* (2013.01); *Y02T 50/67* (2013.01)

(58) Field of Classification Search
CPC .. F23R 3/002; F23R 3/007; F23R 3/04; F23R 3/06; F23R 3/44; F23R 3/50; F23R 2900/00018
See application file for complete search history.

(56) References Cited

U.S. PATENT DOCUMENTS

| 4,206,865 A | 6/1980 | Miller |
| 4,485,630 A * | 12/1984 | Kenworthy ............. B23P 15/00 |
| | | 416/97 R |
| 4,628,694 A | 12/1986 | Kelm et al. |
| 5,329,773 A * | 7/1994 | Myers ..................... F23R 3/002 |
| | | 60/757 |

(Continued)

FOREIGN PATENT DOCUMENTS

| EP | 1 329 669 | 7/2003 |
| FR | 2 588 044 | 3/1987 |

(Continued)

OTHER PUBLICATIONS

International Search Report dated May 27, 2011 in PCT/FR10/52600 Filed Dec. 2, 2010.

*Primary Examiner* — Andrew Nguyen
(74) *Attorney, Agent, or Firm* — Oblon, McClelland, Maier & Neustadt, L.L.P.

(57) ABSTRACT

A combustion chamber for a turbine engine such as an airplane turboprop or turbojet has inner and outer annular walls forming bodies of revolution that are connected together by an annular chamber end wall. The inner wall is constituted by a single thickness of material that presents thickness and/or nature varying along the longitudinal axis and/or the circumferential direction of said wall.

7 Claims, 2 Drawing Sheets

(56) References Cited

U.S. PATENT DOCUMENTS

| | | | | |
|---|---|---|---|---|
| 6,314,716 B1* | 11/2001 | Abreu | ........................ | F23R 3/26 |
| | | | | 60/39.23 |
| 6,351,949 B1* | 3/2002 | Rice | ........................ | F23R 3/007 |
| | | | | 403/316 |
| 6,434,821 B1* | 8/2002 | Nelson | .................... | B23P 15/00 |
| | | | | 29/888.01 |
| 2003/0002975 A1* | 1/2003 | Dudebout | ................ | F01D 5/142 |
| | | | | 415/1 |
| 2003/0131603 A1* | 7/2003 | Bolender | ................ | F23R 3/002 |
| | | | | 60/772 |
| 2005/0050896 A1* | 3/2005 | McMasters | ............ | F23M 5/085 |
| | | | | 60/748 |
| 2006/0179770 A1* | 8/2006 | Hodder | ........................ | 52/588.1 |
| 2009/0060723 A1* | 3/2009 | Pieussergues et al. | .... | 415/169.1 |
| 2009/0100839 A1* | 4/2009 | Cazalens et al. | ................ | 60/754 |
| 2010/0011773 A1* | 1/2010 | Suleiman | .................. | F23R 3/06 |
| | | | | 60/752 |
| 2011/0120144 A1 | 5/2011 | Berdou et al. | | |

FOREIGN PATENT DOCUMENTS

| | | | | |
|---|---|---|---|---|
| GB | 2 131 540 | | 6/1984 | |
| WO | WO2009040286 | * | 4/2009 | ................ F23R 3/00 |

* cited by examiner

COMBUSTION CHAMBER FOR A TURBINE ENGINE

The present invention relates to a combustion chamber for a turbine engine such as an airplane turboprop or turbojet.

Such a combustion chamber has coaxial walls forming bodies of revolution that extend one inside the other and that are connected together at their upstream ends by an annular chamber end wall including air feed openings and means for delivering fuel, in particular constituted by injectors.

The inner and outer walls of the chamber have inlet orifices for primary air and for dilution air, and zones presenting multiple perforations for passing cooling air.

In order to withstand extreme temperatures better, it is known to fit thermal barriers on the walls of the combustion chamber, such barriers being in the form of additional thicknesses of material applied against the walls in question.

Document JP 61/67245 describes a combustion chamber in which the inner wall presents thickness that is constant and that is covered in a thermal barrier of varying thickness.

The use of a thermal barrier increases the ability of the chamber to withstand high temperatures, but also increases its weight.

In order to satisfy market requirements, it is necessary to reduce combustion chamber weight. Nevertheless, the lifetime of the combustion chamber must not be shortened. In particular, the walls must be dimensioned in such a manner as to withstand being damaged by creep. The term "creep" is used to designate the irreversible deformation to which a material is subjected by a constant stress that is applied for a sufficient duration. This deformation is made worse by the high temperatures to which the walls of a combustion chamber are subjected.

A particular object of the invention is to provide a solution to this problem that is simple, effective, and inexpensive.

To this end, the invention provides a combustion chamber for a turbine engine such as an airplane turboprop or turbojet, the combustion chamber comprising inner and outer annular walls forming bodies of revolution that are connected together by an annular chamber end wall, the combustion chamber being characterized in that its inner wall is constituted by a single thickness of material that presents thickness and/or nature varying along the longitudinal axis and in the circumferential direction of said wall, while its outer annular wall presents thickness that is substantially constant.

The invention makes it possible to increase the ability of the combustion chamber to withstand extreme temperatures without using thermal barriers and without increasing weight, by locally modifying the thickness and/or the nature of the material constituting the walls of the chamber.

The outer annular wall is generally not as hot as the inner annular wall, and therefore does not require any particular adaptation of its structure.

In an embodiment of the invention, the inner wall of the combustion chamber that is constituted by a single thickness of material has at least one "hot" zone with a large temperature gradient that is of greater thickness, and at least one "cool" zone of smaller temperature gradient that is of smaller thickness.

Since the "hot" zones are the zones that are subjected to the greatest temperature gradients, it is advantageous to increase their thickness.

According to another characteristic of the invention, the inner wall of the combustion chamber that is constituted as a single thickness of material presents at least two adjacent zones made of different materials.

As mentioned above, in the zones having the highest temperatures or the zones that are subjected to the greatest temperature gradients, it is possible, locally, to use a material that withstands those conditions better, and in the zones that are of lower temperature or that are subjected to smaller temperature gradients, it is possible, locally, to use a material that withstands those conditions less well, but that is lighter in weight.

Preferably, the inner wall of the combustion chamber of varying thickness is made by machining.

Machining makes it possible to obtain dimensional tolerances that are smaller than those that can be obtained by the sheet metal forming that is conventionally used for making combustion chambers.

Furthermore, machining enables the thickness of the inner wall to be varied both along the longitudinal axis and in a circumferential direction.

In a variant, the inner wall of the combustion chamber of varying thickness is made by stretching and forming sheet metal.

This method is simpler and less expensive than machining.

The zones of varying thickness and/or of varying nature of the inner wall of the combustion chamber comprise one zone forming part of the group comprising the zones situated between the injectors, the zones including primary air and dilution air holes, the zones including annular fastening flanges, and the zones including multiple perforations.

The invention also provides a turbine engine such as an airplane turboprop or turbojet, the engine including a combustion chamber of the above-described type.

The invention can be better understood and other details, characteristics, and advantages of the invention appear on reading the following description made by way of non-limiting example with reference to the accompanying drawings, in which.

Figure 1:
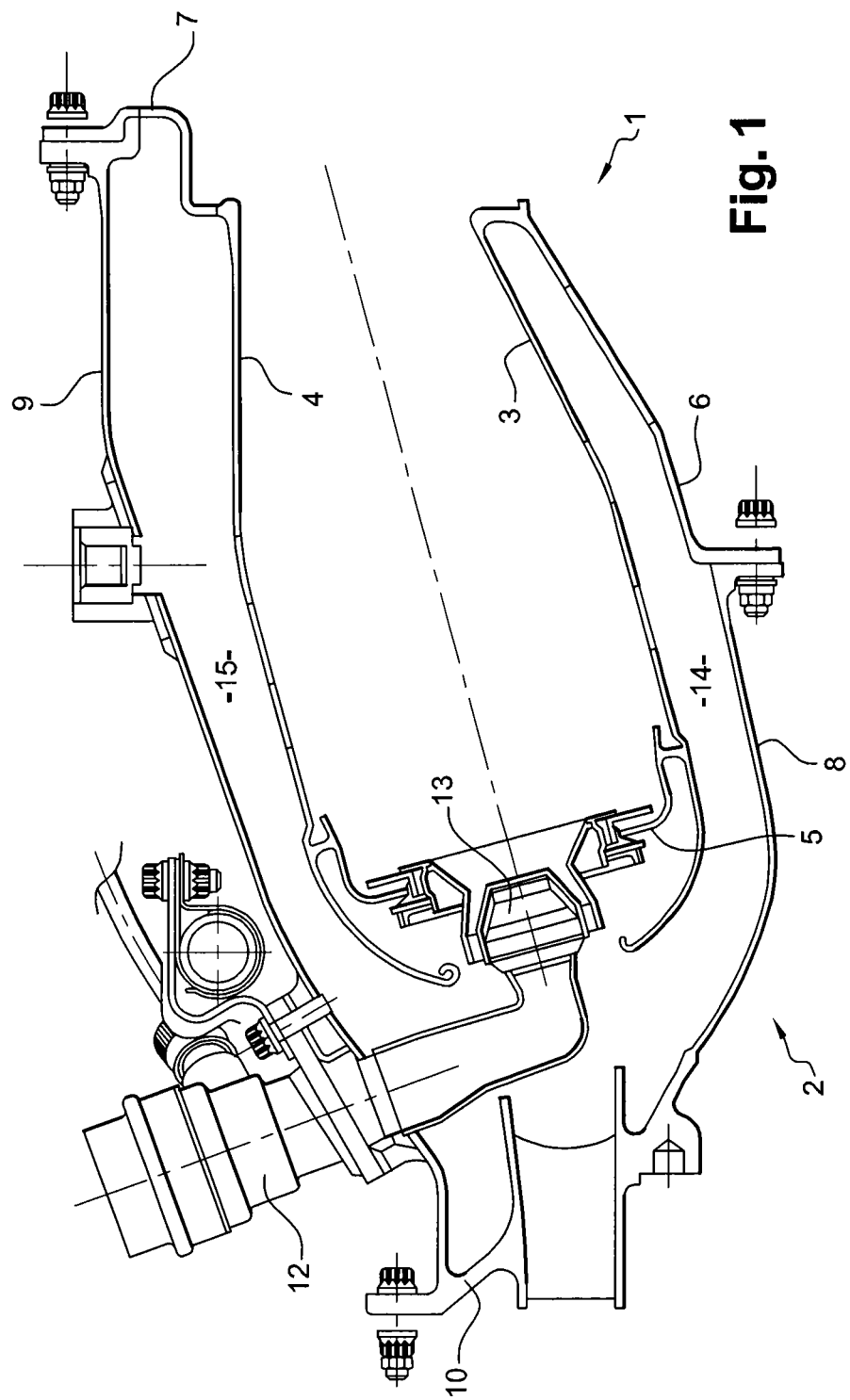
FIG. 1 is a diagrammatic half-view in axial section of an annular combustion chamber of a turbine engine.
Figure 2:
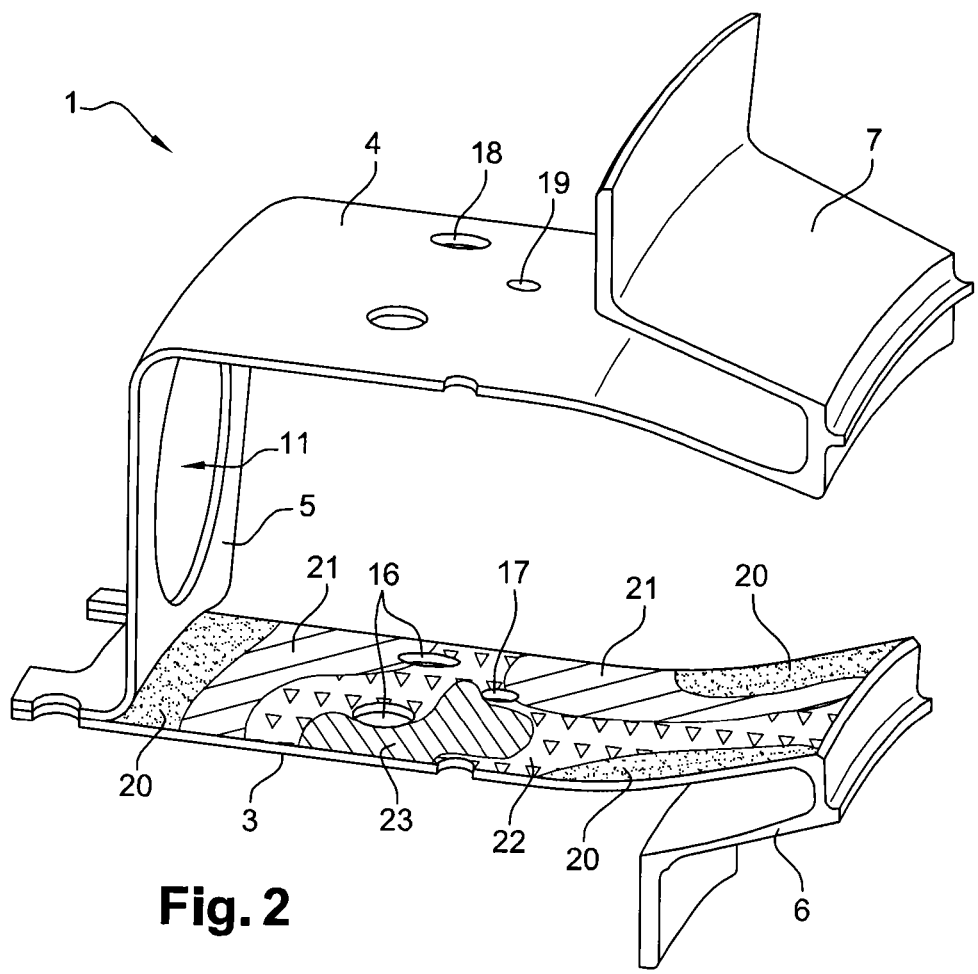
FIG. 2 is a perspective view of a sector of the FIG. 1 combustion chamber.

As shown in FIGS. 1 and 2, an annular combustion chamber 1 of a turbine engine is arranged at the outlet from a diffuser 2, itself situated at the outlet from a compressor (not shown), and comprises inner and outer annular walls 3 and 4 constituting bodies of revolution that are connected at the upstream end by an annular chamber end wall 5 and that are fastened at their downstream ends by inner and outer annular flanges 6 and 7 respectively to an inner frustoconical shroud 8 of the diffuser 2 and to one end of an outer casing 9 of the chamber 1, the upstream end of the casing 9 being connected by an outer frustoconical shroud 10 to the diffuser 2.

The annular chamber end wall 5 has openings 11 (FIG. 2) through which air from the diffuser 2 passes and that serve for mounting fuel injectors 12 that are fastened to the outer casing 9 and that are regularly distributed on a circumference around the longitudinal axis of the chamber. Each injector 12 comprises a fuel injector head 13 centered in an opening 11 in the annular wall 5 and extending along the axis of the opening 11.

Some of the air flow delivered by the compressor and leaving the diffuser 2 passes through the openings 11 and feeds the combustion chamber, while the remainder of the air flow is fed to inner and outer annular channels 14 and 15 that extend past the combustion chamber.

The inner channel 14 is formed between the inner shroud 8 of the diffuser 2 and the inner wall 3 of the chamber, and the air that passes along this channel is shared between a flow that penetrates into the chamber via orifices 16 and 17 for primary air and for dilution air (FIG. 2) in the inner wall 3, and a flow that passes through holes in the inner flange 6 of the chamber 1 for the purpose of cooling components (not shown) that are situated downstream from the chamber 1.

The outer channel 15 is formed between the outer casing 9 and the outer wall 4 of the chamber 1, and the air that passes along this channel is shared between a flow that penetrates into the chamber via orifices 18 and 19 for primary air and for dilution air (FIG. 2) in the outer wall 4, and a flow that passes through holes in the outer flange 7 in order to cool components situated downstream.

The primary air inlet orifices 16 and 18 are regularly distributed around the circumferences of the inner and outer walls 3 and 4 respectively, being centered on the axis of the chamber 1, and the dilution air inlet orifices 17 and 19 are regularly distributed on circumferences of the inner and outer walls 3 and 4 respectively, being centered on the axis of the chamber 1, downstream from the orifices 16 and 18.

The inner and outer annular walls 3 and 4 also include microperforations (not shown) for passing cooling air.

In operation, the outer and inner annular walls 4 and 3 present zones having different temperatures, this temperature non-uniformity being represented diagrammatically in FIG. 2 in the form of zones 20, 21, 22, and 23 that are shaded differently from one another.

This phenomenon relates in particular to the inner annular wall 3. These temperature zones are given numbers that increase with increasing temperature. Thus, the zones 20 are the zones that are relatively "cool" being subjected to the smallest temperature gradients, whereas the zone 23 is the zone that is the "hottest", being subjected to the greatest temperature gradient. This distribution of the zones is given purely by way of example and results specifically from the particular structure of the combustion chamber 1.

The presence and the locations of the various zones 20 to 23 can be revealed by simulation by computation or by applying a paint that reacts to temperature so that its color, after the combustion chamber has been in operation, varies locally as a function of temperature.

According to the invention, the inner wall 3 is constituted by a single thickness of material that presents thickness and/or nature varying along the longitudinal axis and/or along the circumferential direction of said wall.

In the embodiment shown in the figures, the thickness of the inner wall is caused to vary locally, which wall has the zones 20 to 23 of different temperatures.

Figure 3:
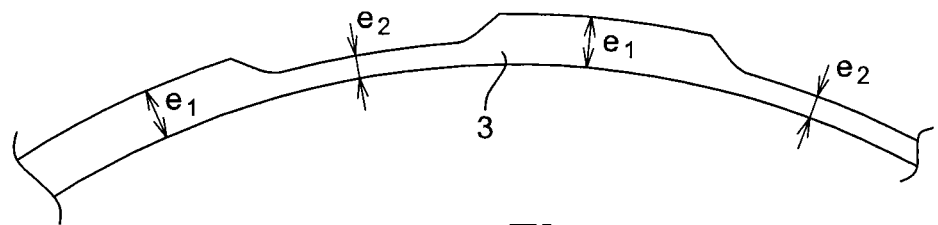
FIG. 3 is a detail view of the invention, in the form of a section of the inner annular wall of the FIG. 1 combustion chamber.

Thus, as shown in FIG. 3, the inner annular wall 3 is made as a single thickness of material and it has zones of greater thickness e1 (see FIG. 3), e.g. the zones 22 and 23, and zones of smaller thickness e2, e.g. the zones 20 and 21.

The thicker zones are those that are subjected in operation to the highest temperature, e.g. temperatures of the order of 1000° C. These zones present thickness e1 lying in the range 1 millimeter (mm) to 2 mm, and preferably being about 1.5 mm. Conversely, the thinner zones are zones that, in operation, are subjected to temperatures that are lower. These zones have a thickness e2 lying in the range 0.5 mm to 1 mm, and they are preferably about 1 mm thick.

The outer annular wall 4 presents thickness that is substantially constant, lying in the range 1 mm to 1.5 mm, and preferably being about 1.2 mm.

By way of example, it is thus possible, starting from a prior art combustion chamber in which the walls forming bodies of revolution present a constant thickness of 1.5 mm, to produce a combustion chamber that is of lighter weight, having an outer wall with a thickness of 1.2 mm and an inner wall with a thickness of 1.5 mm in hot zones and of 1 mm in cooler zones, the weight of this chamber being equal to the weight of a chamber in which all of the walls have a constant thickness equal to 1.2 mm.

The combustion chamber of the invention, and in particular its inner wall 3 of varying thickness, is made by machining.

Alternatively, the inner wall 3 of varying thickness is made by stretching and forming sheet metal.

In an embodiment that is not shown in the drawings, the zones of varying thickness may be replaced by or may include zones of different natures, so as to comprise zones made of material that withstand high temperatures in the hottest zones, and zones made of a material that does not withstand such high temperatures but that is lighter in weight in the cooler zones.

Similarly, the zones of different natures may serve to avoid cracks forming, with the material being changed locally so that zones that are initially stressed in traction, i.e. zones in which cracks may start, are actually stressed in compression as a result of the behavior of contiguous zones.

Each of these embodiments enable the weight of the combustion chamber to be reduced while improving its ability to withstanding high temperatures, and thus its lifetime.

The zones of varying thickness and/or nature in the inner wall 3 are, in particular, zones that are situated between the injectors 12, the zones including the primary air and dilution air holes 16 and 17, the zones including the annular fastening flanges 6, and the zones including multiple perforations.

The invention claimed is:

1. A combustion chamber for a turbine engine such as an airplane turboprop or turbojet, the combustion chamber comprising:
   inner and outer annular walls forming bodies of revolution that are connected together by an annular chamber end wall, wherein
   the annular chamber end wall includes openings through which air enters the combustion chamber with a fuel injector head centered in each of the openings,
   the inner and outer annular walls include primary air holes and dilution air holes,
   the inner wall of the combustion chamber includes a single thickness of material that presents a thickness that varies along a longitudinal axis and in a circumferential direction of said inner wall,
   the outer wall of the combustion chamber presents thickness that is substantially constant,
   the thickness of the inner wall varies locally according to a group of zones, the zones being defined by relative temperature gradients subjected to the zones from combustion in the combustion chamber,
   the inner wall includes a first zone of the group of zones that is a relatively hot zone of combustion at least partially surrounding a first portion of a perimeter of a first primary air hole of the primary air holes, wherein the first zone is subjected to a first temperature gradient and has a first thickness, and
   the inner wall includes a second zone of the group of zones that is a relatively cool zone of combustion subjected to a second temperature gradient smaller than the first temperature gradient and that has a second thickness smaller than the first thickness, the second zone being continuous and at least partially surrounding the first zone such that the second zone is at least partially upstream and downstream from the first zone with regard to the openings, wherein the second zone at least partially surrounds a remaining portion of the perimeter of the first primary air hole.

2. The combustion chamber according to claim 1, wherein the inner wall of the single thickness of material includes at least two adjacent zones of the group of zones made of different materials.

3. The combustion chamber according to claim 1, wherein the inner wall of varying thickness is made by machining.

4. The combustion chamber according to claim 1, wherein the inner wall of varying thickness is made by stretching and forming sheet metal.

5. A turbine engine such as an airplane turboprop or turbojet, the engine comprising a combustion chamber according to claim 1.

6. The combustion chamber according to claim 1, wherein the thickness of the inner wall increases locally with respect to a temperature increase of the respective zone of the group of zones.

7. The combustion chamber according to claim 1, wherein the zones are situated between injectors, the zones including annular fastening flanges, and the zones including multiple perforations.

\* \* \* \* \*